US006916367B2

(12) United States Patent
Palumbo

(10) Patent No.: US 6,916,367 B2

(45) **Date of Patent: *Jul. 12, 2005**

(54) MODIFIED PIGMENTS AND PROCESS FOR PREPARING MODIFIED PIGMENTS

(75) Inventor: Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/434,972

(22) Filed: May 9, 2003

(65) Prior Publication Data

US 2004/0007152 A1 Jan. 15, 2004

Related U.S. Application Data

(63) Continuation-in-part of application No. 10/142,596, filed on May 10, 2002, now Pat. No. 6,833,026.

(51) Int. Cl.[7] .......................... C09D 11/00; C09C 1/44

(52) U.S. Cl. ...................... 106/473; 106/31.6; 106/413; 106/476; 106/493; 106/494; 106/495; 106/496; 106/497; 106/498; 106/499; 523/160; 524/556; 524/599; 524/609

(58) Field of Search ................................ 106/31.6, 413, 106/473, 476, 493, 494, 495, 496, 497, 498, 499; 523/160; 524/556, 599, 609

(56) References Cited

U.S. PATENT DOCUMENTS

| | | | | |
|---|---|---|---|---|
| 3,479,300 | A | 11/1969 | Rivin et al. | 252/430 |
| 4,014,844 | A | 3/1977 | Vidal et al. | 260/31.2 R |
| 4,946,509 | A | 8/1990 | Schwartz et al. | 106/496 |
| 5,281,261 | A | 1/1994 | Lin et al. | 106/20 R |
| 5,418,277 | A | 5/1995 | Ma et al. | 524/520 |
| 5,545,504 | A | 8/1996 | Keoshkerian et al. | 430/137 |
| 5,554,739 | A | 9/1996 | Belmont | 534/885 |
| 5,571,311 | A | 11/1996 | Belmont et al. | 106/20 |
| 5,630,868 | A | 5/1997 | Belmont et al. | 106/31.75 |
| 5,698,016 | A | 12/1997 | Adams et al. | 106/316 |
| 5,713,988 | A | 2/1998 | Belmont et al. | 106/31.6 |
| 5,714,993 | A | 2/1998 | Keoshkerian et al. | 347/95 |
| 5,837,045 | A | 11/1998 | Johnson et al. | 106/31.85 |
| 5,851,280 | A | 12/1998 | Belmont et al. | 106/472 |
| 5,885,335 | A | 3/1999 | Adams et al. | 106/316 |
| 5,895,522 | A | 4/1999 | Belmont et al. | 106/31.6 |
| 5,900,029 | A | 5/1999 | Belmont et al. | 8/550 |
| 5,914,806 | A | 6/1999 | Gordon II et al. | 359/296 |
| 5,922,118 | A | 7/1999 | Johnson et al. | 106/31.6 |
| 5,952,429 | A | 9/1999 | Ikeda et al. | 525/326.1 |
| 5,964,935 | A | 10/1999 | Chen et al. | 106/401 |
| 5,968,243 | A | 10/1999 | Belmont et al. | 106/31.65 |
| 5,976,233 | A | 11/1999 | Osumi et al. | 106/31.75 |
| 6,042,643 | A | 3/2000 | Belmont et al. | 106/472 |
| 6,068,688 | A | 5/2000 | Whitehouse et al. | 106/31.65 |
| 6,103,380 | A | 8/2000 | Devonport | 428/403 |
| 6,110,994 | A | 8/2000 | Cooke et al. | 523/215 |
| 6,150,433 | A | 11/2000 | Tsang et al. | 523/160 |
| 6,221,143 | B1 | 4/2001 | Palumbo | 106/31.6 |
| 6,221,932 | B1 | 4/2001 | Moffatt et al. | 523/160 |
| 6,235,829 | B1 | 5/2001 | Kwan | 524/495 |
| 2001/0036994 | A1 | 11/2001 | Bergemann et al. | 524/495 |

FOREIGN PATENT DOCUMENTS

| | | | |
|---|---|---|---|
| EP | 0 677 556 A2 | 10/1995 | C09B/67/08 |
| EP | 0 688 836 A2 | 12/1995 | C09D/11/02 |
| EP | 0 839 883 A2 | 5/1998 | C09D/11/00 |
| GB | 2 330 842 | 5/1999 | C09B/67/54 |
| JP | 57-21466 | 2/1982 | C09D/11/00 |
| JP | 6-128517 | 5/1994 | C09D/11/02 |
| JP | 2002-121412 | 4/2002 | C09B/67/20 |
| WO | WO97/47697 | 12/1997 | C09D/11/00 |
| WO | WO99/23174 | 5/1999 | C09C/1/56 |
| WO | WO99/31175 | 6/1999 | C08K/9/04 |
| WO | WO99/38921 | 8/1999 | C09C/1/56 |
| WO | WO99/51690 | 10/1999 | C09B/69/00 |
| WO | WO99/63007 | 12/1999 | C09C/1/56 |
| WO | WO00/05313 | 2/2000 | C09C/3/10 |
| WO | WO00/22051 | 4/2000 | C09C/1/56 |
| WO | WO00/43446 | 7/2000 | C08K/9/06 |
| WO | WO00/52102 | 10/2000 | C09B/67/00 |
| WO | WO00/68321 | 11/2000 | C09C/3/10 |
| WO | WO01/25340 | 4/2001 | C09B/67/20 |
| WO | WO01/51566 | 7/2001 | C09C/3/10 |
| WO | WO01/70866 | 9/2001 | |
| WO | WO02/04210 | 1/2002 | B41C/1/10 |
| WO | WO03/08509 | 1/2003 | C09D/11/00 |

OTHER PUBLICATIONS

International Search Report for PCT/US03/14647, mailed Aug. 13, 2003.

JP11246806 A to Toyo Ink Mfg. Co. Ltd. Publication Date Sep. 14, 1999 Abstract Only (from Patent Abstracts of Japan).

JP11080636 A to Canon Inc., Publication Date Mar. 26, 1999 Abstract Only (from Patent Abstracts of Japan).

JP11256066 A to Tokai Carbon Co. Ltd., Publication Date Sep. 21, 1999 Abstract Only (from Patent Abstracts of Japan).

JP2002–121412 A to Nippon Shokubai Co., Ltd, Publication Date Apr. 23, 2002 Abstract Only (from Patent Abstracts of Japan).

*Primary Examiner*—Anthony J. Green

(57) ABSTRACT

Processes for preparing modified pigments are described. In one embodiment, the process comprises the step of combining, in any order, a pigment having attached an electrophilic group and a thiol reagent comprising at least one —SH group and at least two ionic or ionizable groups. In a second embodiment, the process comprises the step of combining, in any order, a pigment having attached an electrophilic group and a thiopolymer comprising at least one —H group. Modified pigments are also described.

8 Claims, 2 Drawing Sheets

MODIFIED PIGMENTS AND PROCESS FOR PREPARING MODIFIED PIGMENTS

CROSS-REFERENCE TO RELATED APPLICATION

This application is a continuation-in-part of prior U.S. patent application Ser. No. 10/142,596, filed on May 10, 2002 now U.S. Pat. No. 6,833,026.

BACKGROUND OF THE INVENTION

1. Field of the Invention

The present invention relates to modified pigments and to processes for preparing modified pigments.

2. Description of the Related Art

The surface of pigments contain a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups, such as ionic or ionizable groups, onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

Other methods to prepare modified pigments have also been described. For example, PCT Publication No. WO 01/51566 discloses methods of making a modified pigment by reacting a first chemical group and a second chemical group to form a pigment having attached a third chemical group. Ink compositions containing these pigments are also described.

While these methods provide modified pigments having attached groups, there remains a need for improved modified pigments as well as for processes for attaching groups and, in particular, polymeric groups, to a pigment. These additional methods may provide advantageous products and alternatives for forming modified pigments.

SUMMARY OF THE INVENTION

The present invention relates to processes for preparing modified pigments. In one embodiment, the process comprises the step of: combining, in any order, a pigment having attached an electrophilic group and a thiol reagent comprising at least one —SH group and at least two ionic or ionizable groups. Preferably the thiol reagent is an alkylthiol substituted with at least two carboxylic acid groups. In a second embodiment, the process comprises the step of: combining, in any order, a pigment having attached an electrophilic group and a thiopolymer comprising at least one —SH group and at least one ionic or ionizable group. Preferably the thiopolymer comprises the reaction product of a polymer having at least one anhydride, at least one activated carboxylic acid, or at least one carboxylic acid or salt thereof; an aminoalkane thiol or an aromatic amino thiol; and optionally an activating agent.

The present invention further relates to modified pigments. In one embodiment, the modified pigment comprises a pigment having attached a group comprising the formula —S—[PI]. In a second embodiment, the modified pigment comprises a pigment having attached a group comprising the formula —X-Sp-S—[PI], wherein X is an arylene, heteroarylene, or alkylene group, Sp is a spacer group. For both embodiments, PI represents an organic group substituted with at least two ionic or ionizable groups or a polymeric group comprising at least one ionic or ionizable group.

The present invention further relates to ink compositions, in particular inkjet ink compositions, comprising the modified pigments described herein.

DETAILED DESCRIPTION OF THE INVENTION

Figure 1:
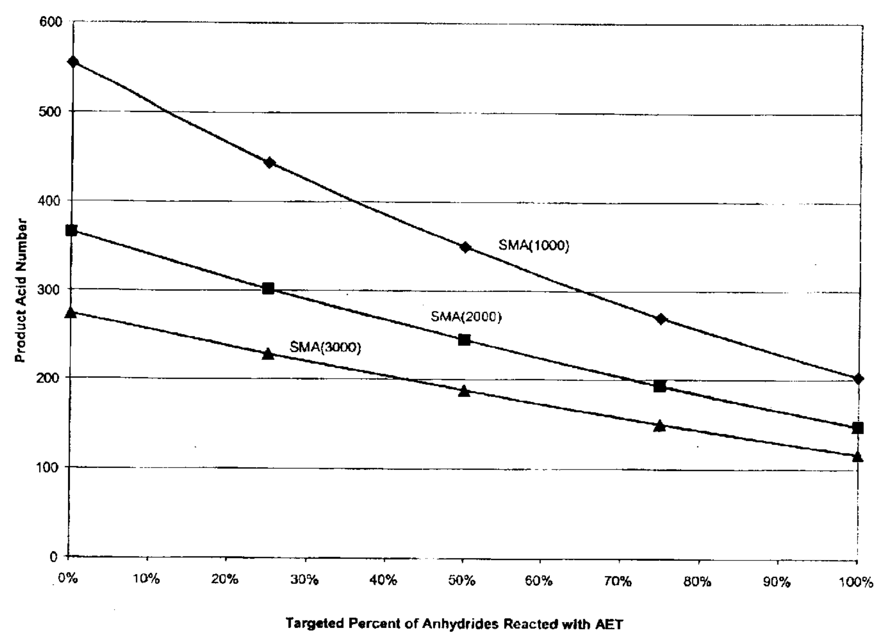
FIG. 1 is a graph showing the effect of the targeted percent of anhydrides reacted with aminoethane thiol (AET) on the expected acid number of the resulting product for several styrene-maleic anhydride polymers.

The present invention relates to processes for preparing modified pigment products as well as to the modified pigment products themselves.

In the process of the present invention, a pigment having attached an electrophilic group is combined with an SH-containing compound. The pigment can be any type of pigment conventionally used by those skilled in the art, such as black pigments and other colored pigments. Preferably, when the pigment is a black pigment, the pigment is carbon black. Mixtures of different pigments can also be used. These pigments can also be used in combination with a variety of different types of dispersants in order to form stable dispersions and inks.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P).

The pigment may also be chosen from a wide range of conventional colored pigments. The colored pigment can be blue, brown, cyan, green, white, violet, magenta, red, orange, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The pigment can have a wide range of BET surface areas, as measured by nitrogen adsorption. It is well recognized by those skilled in the art that the pigment may be subject to conventional size reduction or comminution techniques, such as ball or jet milling, to reduce the pigment to a smaller particle size, if desired.

The electrophilic group of the pigment used in the process of the present invention comprises any group capable of reacting with a material having at least one thiol group. Thus, for example, the electrophilic group may comprise a carboxylic acid or ester, an activated carboxylic acid, an acid chloride, a sulfonyl chloride, an acyl azide, an isocyanate, a ketone, an aldehyde, an anhydride, an α,β-unsaturated ketone, aldehyde, or sulfone, an alkyl halide, an epoxide, an alkyl sulfonate or sulfate, a triazene, or salts and derivatives thereof. Preferably, the electrophilic group is an α,β-unsaturated ketone, aldehyde, or sulfone group or an alkylsulfate group or salt thereof. For example, the electrophilic group may be a 2-(sulfatoethyl) sulfone group or a salt thereof.

The pigment having attached an electrophilic group can be prepared using methods known to those skilled in the art. For example, these pigments can be prepared using the methods described in U.S. Pat. Nos. 5,851,280, 5,698,016, 5,922,118, and 5,837,045, and PCT Publication Nos. WO 99/51690 and WO 00/22051, the descriptions of which are fully incorporated herein by reference. These methods provide for a more stable attachment of the groups onto the pigment compared to traditional adsorbed groups, such as polymers, surfactants, and the like. The pigment having attached an electrophilic group may also be prepared using the method described in PCT Publication No. WO 01/51566, which is incorporated in its entirety herein by reference.

The amount of electrophilic groups can be varied. Preferably, the total amount of electrophilic groups is from about 0.01 to about 10.0 micromoles of groups/$m^2$ surface area of pigment, as measured by nitrogen adsorption (BET method). For example, the amount of electrophilic groups is from about 0.5 to about 4.0 micromoles/$m^2$. Additional attached organic groups which are not reactive with the thiol reagent may also be used.

The pigment having attached an electrophilic group may be purified by washing, such as by filtration, centrifugation, or a combination of the two methods, to remove unreacted raw materials, byproduct salts and other reaction impurities. The pigments may also be isolated, for example, by evaporation or it may be recovered by filtration and drying using known techniques to those skilled in the art. The pigment may also be dispersed into a liquid medium, and the resulting dispersions may be purified or classified to remove impurities and other undesirable free species which can co-exist in the dispersion as a result of the manufacturing process. For example, the dispersion can be purified to remove any undesired free species, such as unreacted treating agent using known techniques such as ultrafiltration/diafiltration, reverse osmosis, or ion exchange.

In one embodiment, the process of the present invention comprises the step of combining a pigment having attached an electrophilic group and a thiol reagent. In this first embodiment, the thiol reagent comprises at least one —SH group and at least two ionic or ionizable groups. As used herein, “at least one” and “at least two” refers to the stoichimetric amount of each group. Thus, for this first embodiment, the thiol reagent has two ionic or ionizable groups for each —SH group. The thiol reagent can be either an alkyl or aryl thiol that is substituted with at least two ionic or ionizable groups. The amount of thiol reagent can be any amount capable of reacting with the electrophilic groups on the pigment. Preferably, the ratio of the weight of the thiol reagent to the weight of the pigment is from about 0.1/1 to about 10/1 and more preferably from about 0.2/1 to about 2/1.

An ionic group is either anionic or cationic and is associated with a counterion of the opposite charge including inorganic or organic counterions such as $Na^+$, $K^+$, $Li^+$, $NH_4^+$, $NR'_4{}^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Organic ionic groups include those described in U.S. Pat. No. 5,698,016, the description of which is fully incorporated herein by reference.

The thiol reagent may comprise at least two anionic of anionizable groups. Anionic groups are negatively charged ionic groups that may be generated from groups having ionizable substituents that can form anions (anionizable groups), such as acidic substituents. They may also be the anion in the salts of ionizable substituents.

Representative examples of anionic groups include $—COO^-$, $—SO_3^-$, $—OSO_3^-$, $—HPO_3^-$, $—OPO_3^{-2}$, and $—PO_3^{-2}$. Representative examples of anionizable groups include —COOH, $—SO_3H$, $—PO_3H_2$, —R'SH, —R'OH, and $—SO_2NHCOR'$, where R' represents hydrogen or an organic group such as a substituted or unsubstituted aryl and/or alkyl group. Preferably, the anionic or anionizable group is a carboxylic acid group, a sulfonic acid group, or salts thereof. Thus, the thiol reagent can be an alkylthiol that is substituted with at least two carboxylic acid groups, such as, for example, mercaptosuccinic acid.

The thiol reagent may comprise at least one cationic or cationizable group. Cationic groups are positively charged organic ionic groups that may be generated from ionizable substituents that can form cations (cationizable groups), such as protonated amines. For example, alkyl or aryl amines may be protonated in acidic media to form ammonium groups $—NR'_2H^+$, where R' represent an organic group such as a substituted or unsubstituted aryl and/or alkyl group. The thiol reagent may also comprise both an anionic or anionizable group and a cationic or cationizable group.

For this first embodiment, it is preferred that the pigment having attached an electrophilic group and the thiol reagent are combined under conditions which form the thiolate of the thiol reagent. For example, it is preferred that the pigment and thiol reagent are combined under alkaline conditions, which form the thiolate and may assist in the reaction of the thiol reagent with the pigment. In addition, alkaline conditions may increase the solubility of the thiol reagent, particularly when the ionic or ionizable groups of the thiol reagent are anionic or anionizable groups. Thus, it is preferred that the pigment and thiol reagent are combined at a pH greater than or equal to 7, more preferably greater than or equal to 9, and most preferably greater than or equal to 11.

In a second embodiment, the present invention comprises the step of combining, in any order, a pigment having attached an electrophilic group and a thiopolymer comprising at least one —SH group. The —SH group may be present along the backbone of the thiopolymer, such as, for example, as part of a pendant group, or as a terminating group on the end(s) of the polymer. The thiopolymer preferably further comprises at least one ionic or ionizable group. The ionic or ionizable groups may be any of those described above. Thus, the thiopolymer may be any polymer comprising at least one —SH group and at least one ionic or ionizable group. The amount of thiopolymer can be any amount capable of reacting with the electrophilic groups on the pigment. Preferably, the ratio of the weight of thiopolymer to the weight of the pigment is from about 0.1/1 to about 10/1, and more preferably from about 0.2/1 to about 2/1.

Preferably, the thiopolymer comprises the reaction product of a polymer having at least one reactive group, such as an anhydride, an activated carboxylic acid, or a carboxylic acid group or salt thereof, and a substituted alkyl or aryl thiol, such as an aminoalkane thiol or an aromatic amino thiol. Preferably, the substituted alkyl or aryl thiol is aminoethane thiol.

Examples of polymers having at least one reactive group include anhydride polymers, such as poly(styrene-maleic anhydride) and carboxylic acid polymers, such as polyacrylic acid, polymethacrylic acid, and copolymers of acrylic or methacrylic acid, including poly(styrene-acrylic acid), poly(styrene-methacrylic acid), poly(ethylene-acrylic acid), or copolymers of acrylic and methacrylic acid with alkyl acrylates or methacrylates. Other suitable carboxylic acid polymers include polyesters, polyurethanes, and polyamides, which have carboxylic acid end groups. If needed to improve the reactivity of the carboxylic acid groups, an activating agent may optionally be added, thus forming a polymer having at least one activated carboxylic acid. The activated carboxylic acid may be a mixed anhydride, such as that formed by the reaction of a carboxylic acid or salt with ethyl chloroformate. Other activated carboxylic acid groups and activating agents to prepare them will be known to one skilled in the art.

When the thiopolymer is the reaction product of a polymer having at least one reactive group and a substituted alkyl or aryl thiol, the amount of each reagent need not be stoichiometric. For example, the amount of aminoalkyl or aromatic amino thiol may be less than the amount of the reactive group in the polymer. Any remaining reactive groups may be further reacted. For example, when the resulting thiopolymer has remaining anhydride groups, these may be further reacted with base, to hydrolyze the remaining anhydrides and form carboxylic acid groups, or salts thereof. Alternatively, reagents such as alkyl or aryl amines and alcohols may be added to react with the remaining anhydride groups to form amic acids (or imides) and half acid esters, respectively. This resulting thiopolymer can then be used in the process of the present invention to be combined with a pigment having attached an electrophilic group.

For this second embodiment, the process of the present invention may further comprise the step of adding an alkylating agent. The alkylating agent is used to "cap" any thiol groups which remain after the thiopolymer and pigment having attached an electrophilic group have been combined. Alkylating agents for thiol groups are known to one skilled in the art and include, for example, alkyl halides, haloacetates or salts thereof, or α,β-unsaturated carbonyl and sulfonyl compounds such as acrylates and methacrylates (including, for example, acrylic acid, methacrylic acid, or salts thereof), vinyl sulfonic acid or salts thereof, and maleates (including, for example, maleic acid or salts thereof, or maleimide).

The present invention further relates to a modified pigment. In one embodiment, the modified pigment comprises a pigment having attached a group comprising the formula —S—[PI]. The group PI represents an organic group substituted with at least two ionic or ionizable groups. The pigment and ionic or ionizable groups may be any of those described above. For example, the group PI can represent an organic group comprising a branched or unbranched alkyl group substituted with at least two ionic or ionizable groups, preferably at least two carboxylic acid groups. An example of a preferred group PI is a succinic acid group or salt thereof.

The group PI may also represent a polymeric group comprising at least one ionic or ionizable group. The ionic or ionizable groups may be any of those described above. The polymeric group can be a homopolymer, copolymer, terpolymer, and/or a polymer containing any number of different repeating units. Further, the polymeric group can be a random polymer, alternating polymer, graft polymer, block polymer, star-like polymer, and/or comb-like polymer. Preferably, the polymeric group comprises a homopolymer or copolymer of acrylic acid, methacrylic acid, maleic acid, or salts thereof.

In a second embodiment, the modified pigment of the present invention comprises a pigment having attached a group comprising the formula —X-Sp-S—[PI]. X, which is directly attached to the pigment, represents an arylene or heteroarylene group or an alkylene group and is substituted with an Sp group. Sp represents a spacer group. The group PI is as described above and can represent an organic group substituted with at least two ionic or ionizable groups or a polymeric group comprising at least one ionic or ionizable group.

The group Sp represents a spacer group which, as used herein, is a link between two groups. The group Sp can be a bond or a chemical group. Examples of chemical groups include, but are not limited to, $—O_2C—$, —CO—, $—COCH_2—$, $—COC_2H_4—$, $—OCOCH_2—$, $—OCOC_2H_4—$, $—NRCOCH_2—$, $—NRCOC_2H_4—$, $—OSO_2—$, $—SO_2—$, $—SO_2C_2H_4—$, $—SOC_2H_4—$, $—NRSO_2C_2H_4—$, $—S_k—$, —NRCO—, $—NRCOCH(CH_2CO_2R)—$, $—NRCOCH_2CH(CO_2R)—$, —N(COR)(CO)—, imide groups (including maleimide groups), arylene groups, linear or branched alkylene groups, and the like. R, which can be the same or different, represents hydrogen or an organic group such as a substituted or unsubstituted aryl or alkyl group, and k is an integer, such as from 1 to 7.

The group X represents an arylene or heteroarylene group or an alkylene group. X is directly attached to the pigment and is further substituted with an Sp group. The aromatic group can be further substituted with any group, such as one or more alkyl groups or aryl groups. Preferably, the arylene group is phenylene, naphthylene, or biphenylene. When X represents an alkylene group, examples include, but are not limited to, substituted or unsubstituted alkylene groups which may be branched or unbranched. The alkylene group can be substituted with one or more groups, such as aromatic groups. Examples include, but are not limited to, $C_1$–$C_{12}$ groups like methylene, ethylene, propylene, or butylene, groups. Preferably, X is an arylene group.

The group X may be substituted with one or more functional groups. Examples of functional groups include, but are not limited to, R", OR", COR", COOR", OCOR", carboxylates, halogens, CN, $NR"_2$, $SO_3H$, sulfonates, sulfates, NR"(COR"), $CONR"_2$, $NO_2$, $PO_3H_2$, phosphonates, phosphates, N═NR", SOR", $NSO_2R"$, wherein R" which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structure above, the group PI is attached to the pigment through the spacer group Sp and a sulfur atom. However, it will also be recognized that, when the group PI is a polymeric group, the group PI can also be attached to the pigment at multiple points along the polymer chain through proper choice of substituent groups on the repeating monomer units. These substituents may also comprise spacer groups or —X-Sp- groups as described above. Thus, these groups can be attached to the pigment at either end or at points along the backbone.

For the modified pigments of the present invention, the amount of attached groups can be varied. Preferably, the total amount of attached groups is from about 0.01 to about 10.0 micromoles of organic group/$m^2$ surface area of pigment, as measured by nitrogen adsorption (BET method). For example, the amount of attached groups is between from about 0.5 to about 4.0 micromoles/$m^2$. Additional attached groups, not having the formulas described above, may also be used. Furthermore, the modified pigments of the present invention may be purified using the techniques and methods described above.

The modified pigments of the present invention can be used in a variety of applications. For example, the modified pigments can be dispersed in a liquid vehicle and used in an ink or coating application. The vehicle can be either an aqueous or non-aqueous vehicle, depending on the nature of the attached organic group. In particular, the modified pigments can be used in an inkjet ink, such as an aqueous inkjet ink. Suitable additives may be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, dyes, buffers, and the like.

The present invention will be further clarified by the following examples which are intended to be only exemplary in nature.

EXAMPLES

For the following examples, the styrene-co-maleic acid polymers were obtained from the Sartomer Company and are shown in Table 1:

TABLE 1

| Polymer ID | $M_W$ | Styrene:Maleic Anhydride Ratio |
|---|---|---|
| SMA(1000) | 5,500 | 1:1 |
| SMA(2000) | 7,250 | 2:1 |
| SMA(3000) | 9,500 | 3:1 |
| SMA(1440)* | 7,500 | 1.5:1 |

*SMA(1440) polymer was prepared by reacting approximately 65% of the anhydrides of the SMA starting polymer with 2-butoxyethylalcohol to afford the corresponding half acid ester.

Dimethylformamide (DMF), acrylic acid, mercaptosuccinic acid (MEA), aminoethanethiol hydrochloride (AET.HCl), 5,5'-dithiobis(2-nitrobenzoic acid) (DTNB), ethylchloroformate, concentrated HCl, and triethylamine (TEA) were obtained from Aldrich Chemical Co. and used without further purification. Joncryl® 680 was obtained from S. C. Johnson.

Particle size was determined using a Microtrac® Particle Size Analyzer, and the values reported are the mean volume particle size (mV). Percent attached polymer was calculated from thermogravimentric analysis (TGA) using a TA Instruments TGA Model 2950. The samples were analyzed under nitrogen according to the following temperature profile: 10° C./min up to 110° C., hold at 110° C. for 10 minutes, continue heating at 10° C./min up to 800° C., and hold at 800° C. for 10 minutes. Percent attached material is determined from comparison of the weight lost between 110° C. and 800° C. of the final product compared to that of the starting materials.

Examples 1–3

The following examples describe the preparation of a modified pigment of the present invention according to Scheme 1 below:

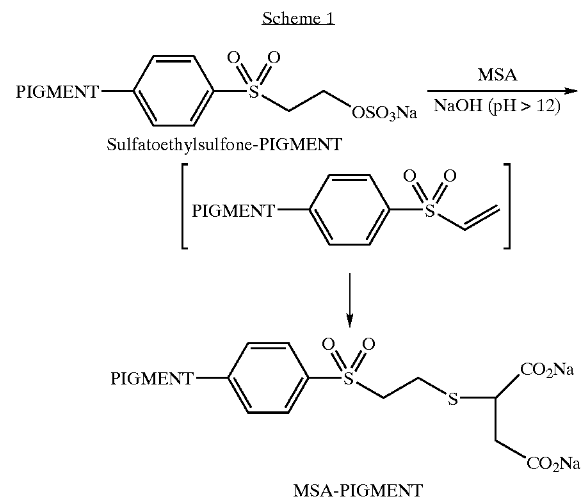

Example 1

A 14.9% aqueous dispersion of Black Pearls® 880 carbon black (available from Cabot Corporation, Boston, Mass.) having attached a 2-(sulfatoethylsulfone) group was prepared according to the procedure described in PCT Publication No. WO 01/51566 to yield a pigment dispersion. The resulting pigment having attached an electrophilic group was analyzed for sodium content to determine that the amount of attached group was 0.3 mmol/g of dry carbon black.

A solution of 0.5 g (3.33 mmol) mercaptosuccinic acid in 5 ml of deionized water was mixed with 20 g of the above pigment dispersion in a round bottom flask and the resultant mixture was stirred at room temperature, under an atmosphere of nitrogen. To this was added dropwise 15 ml of 1N NaOH to afford a pH of 12.8 and then the mixture was stirred overnight to give a dispersion of a modified pigment.

The modified pigment dispersion was purified by diafiltration using a polysulfone hollow fiber membrane with a pore size of 0.05 microns. The solution was first concentrated to 35 ml and then diafiltered with 175 ml 0.1M NaOH followed by 245 ml of deionized water. The final pH of the permeate was between 6–7.

The resulting purified modified pigment dispersion had a particle size of 112 nm and a pH of 11.0. The modified carbon black pigment was analyzed for sodium and compared to the starting pigment having attached an electrophilic group. Results are shown in Table 2 below.

Example 2

For this example, the procedure described in Example 1 was followed, with the exception that the dispersion of Black Pearls® 880 carbon black having attached a 2-(sulfatoethylsulfone) group was replaced with a 5.7% solids dispersion of Pigment Yellow 74 (available from Sun Chemical) having the same attached electrophilic group, also prepared according to the procedure described in WO 01/51560. Results from the Na+ analysis of this modified pigment are shown in Table 2 below.

Example 3

For this example, the procedure described in Example 1 was followed, with the exception that the dispersion of Black Pearls® 880 carbon black having attached a 2-(sulfatoethylsulfone) group was replaced with a 20.51% solids dispersion of Pigment Red 122 (available from Sun Chemical) having the same attached electrophilic group, also prepared according to the procedure described in WO 01/51560. Results from the Na+ analysis of this modified pigment are shown in Table 2 below.

TABLE 2

| Example # | Pigment | % Na before | % Na after |
|---|---|---|---|
| 1 | Black Pearls ® 880 carbon black | 0.69 | 1.1 |
| 2 | Pigment Yellow 74 | 0.20 | 0.50 |
| 3 | Pigment Red 122 | 0.50 | 0.77 |

Examples 4–11

Figure 2:
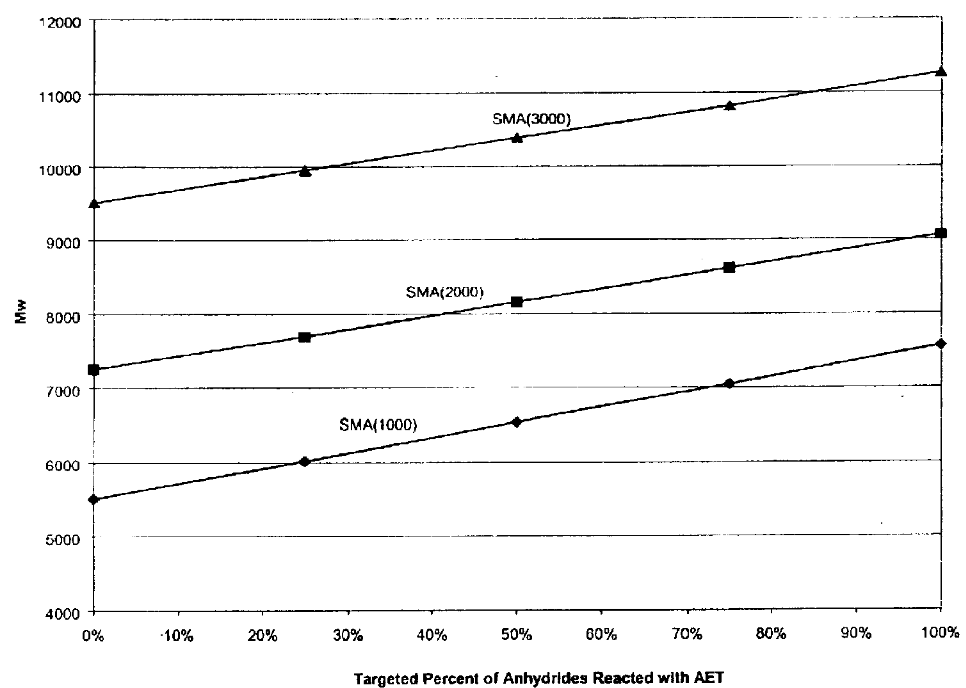
FIG. 2 is a graph showing the effect of the targeted percent of anhydrides reacted with aminoethane thiol (AET) on the expected molecular weight of the resulting product for several styrene-maleic anhydride polymers.

The following examples describe the preparation of an aminoethanethiolated-SMA (styrene-maleic anhydride) polymer and subsequent modified pigment according to Scheme 2 below:

Aminoethanethiol is reacted in DMF with some or all of the anhydrides of the SMA polymer. The resulting product molecular weight and acid number have a direct correlation to the extent of this reaction. FIG. 1 and FIG. 2 show the expected dependence of molecular weight and acid number on the targeted percentage of anhydrides reacted with aminoethane thiol. These are determined from the theoretical ratio of styrene/maleic anhydride in the starting polymer. For example, SMA(3000) has a 3/1 ratio of styrene to maleic anhydride (from the manufacturer's product sheet). If 50% of the anhydride groups are targeted for reaction with AET.HCl, the expected acid number for the resulting product would be approximately 190 and the expected MW would be approximately 10400. Thus, by targeting the percent of anhydrides reacted with the thiol reagent, the properties of the polymer and the subsequent modified pigment may be controlled.

Example 4

A solution was prepared by dissolving 20 g (0.049 mol anhydride) of SMA(3000) in 100 ml of dry DMF. To this stirred solution, at room temperature, under a steady stream of nitrogen gas, was added 4.2 g (0.037 mol) of 2-aminoethanethiol hydrochloride as a solid in one portion and then 5.2 ml (0.074 mol) triethylamine, dropwise. The resultant mixture was heated at 45° C. for 30 minutes and then at room temperature for 4.5 hours. The product was isolated by slowly dropping into vigorously stirred 1N HCl (600 ml). After the addition, the mixture was stirred for another 60 minutes and then suction filtered, washed with 400 ml of 1N HCl and then 400 ML of deionized water. The resulting product was briefly air dried to afford 61 g of a free flowing white solid which contained 62% moisture, as measured by weight loss after heating at 110° C. for 1 hour.

The aminoethanethiolated-SMA polymer was dried at 110° C. Results from elemental combustion analysis are shown in Table 3 below. Thiols were measured by titration with DTNB following a modification of Ellman's procedure (Ellman, G. L. (1958) *Arch. Biochem. Biophys.* 74, 443; *Bioconjugate Techniques*, Greg T. Hermanson, Academic Scheme 2

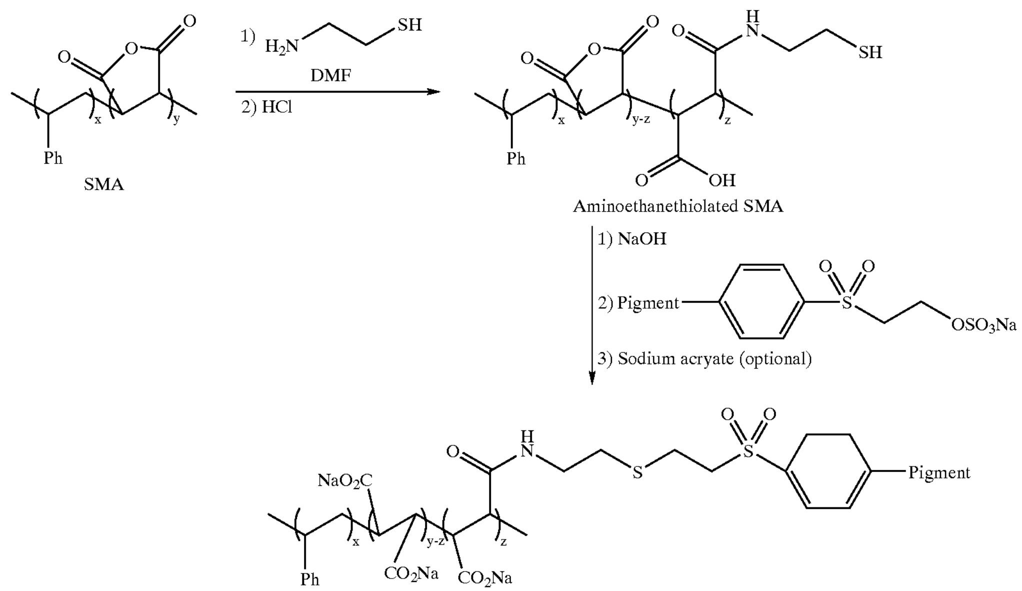

Press, Inc., copyright 1996, p 88). The resulting polymer was found to have 1.4 mmol thiols/g dry polymer.

Example 5

For this example, the procedure described for Example 4 was used, with the differences noted in Table 3. Results from the analysis of the resulting aminoethanethiolated-SMA are shown in Table 3 below.

Example 6

For this example, the procedure described for Example 4 was used, with the differences noted in Table 3. Results from the analysis of the resulting aminoethanethiolated-SMA are shown in Table 3 below.

Example 7

For this example, the procedure described for Example 4 was used, with the differences noted in Table 3. Results from the analysis of the resulting aminoethanethiolated-SMA are shown in Table 3 below.

Example 8

For this example, the procedure described for Example 4 was used, with the differences noted in Table 3. Results from the analysis of the resulting aminoethanethiolated-SMA are shown in Table 3 below. Example 9

For this example, the procedure described for Example 4 was used, with the differences noted in Table 3. Results from the analysis of the resulting aminoethanethiolated-SMA are shown in Table 3 below.

Example 10

For this example, the procedure described for Example 4 was used, with the differences noted in Table 3. Results from the analysis of the resulting aminoethanethiolated-SMA are shown in Table 3 below.

TABLE 3

| Ex. # | Polymer | Anhydrides (mol) | AET.HCl (mol) | % S (Theor.)* | % S (Actual) | % N (Theor.)* | % N (Actual) |
|---|---|---|---|---|---|---|---|
| 4 | SMA(3000) | 0.049 | 0.037 | 5.14 | 5.18 | 2.25 | 2.48 |
| 5 | SMA(3000) | 0.049 | 0.049 | 6.39 | 6.66 | 2.79 | 2.83 |
| 6 | SMA(3000) | 0.049 | 0.021 | 3.12 | 3.07 | 1.36 | 1.65 |
| 7 | SMA(2000) | 0.065 | 0.065 | 8.12 | 8.46 | 3.55 | 3.33 |
| 8 | SMA(2000) | 0.065 | 0.047 | 6.46 | 7.21 | 2.83 | 3.16 |
| 9 | SMA(1000) | 0.10 | 0.10 | 11.5 | 9.14 | 5.03 | 4.4 |
| 10 | SMA(1440) | 0.11 | 0.11 | 2.20 | 1.55 | 0.97 | 0.83 |

*Theoretical % S and % N are based on the theoretical Styrene/Maleic anhydride ratios of the starting polymers.

Example 11

A solution of 145 ml of 1M NaOH was magnetically stirred in a round bottom flask at room temperature while nitrogen gas was bubbled through the liquid for 10 minutes. To this was added 54.8 g of the aminoethanethiolated polymer of Example 4 (62% moisture content). The resultant mixture was heated under nitrogen to 40–50° C. until a clear yellow solution was obtained.

The 14.9% aqueous dispersion of Black Pearls® 880 carbon black having attached a 2-(sulfatoethylsulfone) group described in Example 1 (140 g) was added dropwise to the yellow polymer solution over approximately 5 minutes. An additional 13 ml of 1N NaOH was added to raise the pH to 12–13. The resultant mixture was then stirred at 40–50° C. for 3.5 hours to give a dispersion of the modified pigment of the present invention.

A sodium acrylate solution was prepared by dissolving 7.5 ml acrylic acid into deionized water containing 11.7 g of $NaCO_3$. This solution was added to the modified pigment dispersion to "cap" any unreacted thiol groups. Heating and stirring were continued for another 3 hours and the mixture was then allowed to cool slowly to room temperature. The dispersion of the resulting capped modified pigment was purified by diafiltration as described in Example 1 to reach a final permeate polymer concentration of <50 ppm (monitored by measuring the absorbance of the permeate at 250 nm in a UV-VIS Spectrometer; the concentration of polymer is calculated from the known epsilon).

The capped modified pigment dispersion (11.6% solids, pH=10.15) was found to have a particle size of 120.4 nm and a sodium level of 1.3% (based on the dried carbon black solid). TGA analysis showed that the attached polymer accounted for 14% of the total weight.

Examples 12–13

The following examples describe the preparation of an aminothiolated-SAA (styrene-acrylic acid) polymer and subsequent modified pigment according to Scheme 3 below:

Scheme 3

Ph, $CO_2H$ — Ethylchloroformate, TEA/DMF →

Ph, $CO_2H$, $CO_2COOEt$ — 1) $H_2N$–CH₂CH₂–SH, DMF; 2) HCl →

-continued

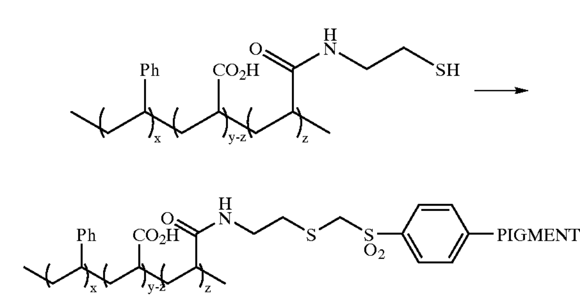

Example 12

To a magnetically stirred solution of 10 g styrene-co-acrylic acid, (Joncryl® 680: $M_w$=4,900, Acid Number=215) dissolved in 100 ml DMF under a steady stream of nitrogen at room temperature was added 5.4 ml (0.039 mol) of triethylamine. To this was added 1.84 ml (0.019 mol) of ethylchloroformate. The solution became slightly warm with some gas evolution and cloudiness. The resultant mixture was stirred at room temperature for 40 minutes. A solution of 2.2 g (0.019 mol) aminoethanethiol hydrochloride and 2.7 ml (0.019 mol) triethylamine in 50 ml DMF was added dropwise to this mixture over 15 minutes, and the resulting cloudy solution was stirred overnight. The product was precipitated by slowly dropping into a rapidly stirred solution of 1N HCl (250 ml). The resulting white precipitate was suction filtered, washed with cold 1N HCl, cold deionized water, and then air dried to afford a chalky white solid. A sample of this aminoethanethiolated SAA polymer was dried at 110° C. Elemental combustion analysis results were as follows: 71.84% C; 7.53% H; 1.53% N; 3.01% S.

Example 13

A solution of 12.5 ml of 0.5 M NaOH was magnetically stirred at room temperature while nitrogen gas was bubbled through the liquid for 10 minutes. To this was added 1 g of the aminoethanethiolated SAA polymer of Example 12. To the resulting solution was added 2.9 g of the 14.9% aqueous dispersion of Black Pearls® 880 carbon black having attached a 2-(sulfatoethylsulfone) group described in Example 1. This gave a final pH of 12.5. This solution was stirred under nitrogen gas overnight. The resulting modified pigment was purified by diafiltration as described in Example 1 to give a dispersion having the following physical properties: pigment concentration: 9.0% (wt/wt); UPA mv=137 nm; % N=0.48%; % S=2.28%; % sulfate=0.35%. TGA analysis showed that the attached polymer accounted for 6% of the total weight.

Examples 14–15

The following examples describe the preparation of an aminoethanethiolated-SMA (styrene-maleic anhydride) polymer additionally functionalized with an alkylamine. In Example 14 the alkylamine is aminoethane sulfonic acid and in Example 15 the alkylamine is a polyamine (Jeffamine® XTJ506).

Example 14

To a 3-neck round bottom flask equipped with an overhead stirrer was added 1.5 liters of DMF followed by 300 g (0.735 mol anhydride) of SMA(3000). The polymer suspension was heated to 40–50° C. to produce a polymer solution. The polymer solution was then de-oxygenated using nitrogen. To this heated polymer solution under nitrogen was added 33.2 g of aminoethanethiol hydrochloride (0.29 mol) and 45.9 g of aminoethane sulfonic acid (0.367 mol), and the mixture was stirred for an additional 30 minutes at 40–50° C. Then 133 g of triethylamine (1.32 mol) was added dropwise. The mixture was allowed to stir, coming to room temperature, overnight. The solution was then added dropwise into 7 liters of 1 M HCl. The resulting white solid was filtered, washed three times with 1 liter of 1 M HCl and four times with 2 liters of DI-water, and then air-dried. Elemental analyses showed that the product contained 2.13% nitrogen and 5.57% sulfur (theoretical values are 2.5% nitrogen and 6% sulfur).

Example 15

To a 3-neck round bottom flask equipped with an overhead stirrer was added 1.5 liters of DMF followed by 300 g (0.735 mol anhydride) of SMA(3000). The polymer suspension was heated to 40–50° C. to produce a polymer solution. The polymer solution was then de-oxygenated using nitrogen. To this heated polymer solution under nitrogen was added 41.5 g of aminoethanethiol hydrochloride (0.355 mol) and 146 g of Jeffamine® XTJ506 (0.146 mol, available from Huntsman Corporation), and the mixture was stirred for an additional 30 minutes at 40–50° C. Then 96 g of triethylamine (0.95 mol) was added dropwise. The mixture was allowed to stir overnight at room temperature under a nitrogen blanket. The solution was then added dropwise into 7 liters of 1 M HCl. The resulting white solid was filtered, washed three times with 1 liter of 1 M HCl and four times with 2 liters of DI-water, and then air-dried. Elemental analyses showed that the product contained 1.21% nitrogen and 2.38% sulfur (theoretical values are 1.1% nitrogen and 2.48% sulfur).

Example 16

A solution of 100 mL of NaOH was magnetically stirred in a round bottom flask at room temperature while nitrogen gas was bubbled through the liquid for 10 minutes. To this was added 37 g of the SMA polymer of Example 14 (46% moisture content). The resultant mixture was heated under nitrogen to 40–50° C. until a clear yellow solution was obtained.

A 10% aqueous dispersion of Black Pearls® 1100 carbon black having attached a 2-(sulfatoethylsulfone) group (400 g), prepared according to the procedure described in WO 01/51560, was added dropwise to the yellow polymer solution over 10 minutes. An additional 25 mL of 1 M NaOH was added to raise the pH to 12–13. The reaction mixture was then stirred at room temperature overnight to give a dispersion of the modified pigment of the present invention.

To the dispersion was added 6.55 g of sodium acrylate to "cap" any unreacted thiol groups. The mixture was allowed to stir for another 2 hours at room temperature. The dispersion of the resulting capped modified pigment was purified by diafiltration as described in Example 1 to reach a final permeate polymer concentration of <50 ppm (monitored by measuring the absorbance of the permeate at 250 nm in a UV-VIS Spectrometer; the concentration of polymer is calculated from the known epsilon).

The capped modified pigment dispersion (9.5% solids, pH 9.72) was found to have a mean volume particle size of 108 nm and a sodium level of 2.5% (based on the dried carbon black solid). TGA analysis showed that the attached polymer accounted for 16% of the total solid weight.

Example 17

A solution of 280 mL of NaOH was magnetically stirred in a round bottom flask at room temperature while nitrogen gas was bubbled through the liquid for 10 minutes. To this was added 322 g of the SMA polymer of Example 15 (69% moisture content). The resultant mixture was heated under nitrogen to 40–50° C. until a clear yellow solution was obtained.

The 10% aqueous dispersion of Black Pearls® 1100 carbon black having attached a 2-(sulfatoethylsulfone) group (1000 g) used in Example 16 was added dropwise to the yellow polymer solution over 10 minutes. An additional 60 mL of 1 M NaOH was added to raise the pH to 12–13.

The reaction mixture was then stirred at room temperature overnight to give a dispersion of the modified pigment of the present invention.

To the dispersion was added 14 g of sodium acrylate to "cap" any unreacted thiol groups. The mixture was allowed to stir for another 2 hours at room temperature. The dispersion of the resulting capped modified pigment was purified by diafiltration as described in Example 1 to reach a final permeate polymer concentration of <50 ppm (monitored by measuring the absorbance of the permeate at 250 nm in a UV-VIS Spectrometer; the concentration of polymer is calculated from the known epsilon).

The capped modified pigment dispersion (10.4% solids, pH=9.51) was found to have a mean volume particle size of 78 nm and a sodium level of 1.3% (based on the dried carbon black solid). TGA analysis showed that the attached polymer accounted for 24% of the total solid weight.

I claim:

1. A modified pigment comprising a pigment having attached a group comprising the formula —X-Sp-S—[PI], wherein X is an arylene, heteroarylene, or alkylene group, Sp is a spacer group, and PI represents a polymeric group comprising at least one ionic or ionizable group comprising the reaction product of a polymer having at least one anhydride, at least one activated carboxylic acid, or at least one carboxylic acid or salt thereof and an alkylamine, arylamine, or alcohol.

2. The modified pigment of claim 1, wherein the alkylamine is aminoethane sulfonic acid or a polyamine.

3. The modified pigment of claim 1, wherein the ionic or ionizable group is a carboxylic acid group, a sulfonic acid group, or a salt thereof.

4. The modified pigment of claim 1, wherein the polymeric group comprises a homopolymer or copolymer of acrylic acid, methacrylic acid, maleic acid, or salts thereof.

5. The modified pigment product of claim 1, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

6. The modified pigment product of claim 1, wherein the black pigment is carbon black.

7. An ink composition comprising a) a liquid vehicle and b) the modified pigment of claim 1.

8. The ink composition of claim 7, wherein the ink composition is an inkjet ink composition.

* * * * *